US008974184B2

(12) United States Patent
Becker et al.

(10) Patent No.: US 8,974,184 B2
(45) Date of Patent: Mar. 10, 2015

(54) TURBOMACHINERY HAVING SELF-ARTICULATING BLADES, SHUTTER VALVE, PARTIAL-ADMISSION SHUTTERS, AND/OR VARIABLE PITCH INLET NOZZLES

(75) Inventors: Frederick E. Becker, Reading, MA (US); Francis A. DiBella, Roslindale, MA (US); Kevin D. Fairman, Lunenburg, MA (US); Alexander Gofer, White River Junction, VT (US)

(73) Assignee: Concepts ETI, Inc., Wilder, VT (US)

( * ) Notice: Subject to any disclaimer, the term of this patent is extended or adjusted under 35 U.S.C. 154(b) by 97 days.

(21) Appl. No.: 13/399,604

(22) Filed: Feb. 17, 2012

(65) Prior Publication Data

US 2013/0145753 A1 Jun. 13, 2013

Related U.S. Application Data

(60) Provisional application No. 61/444,225, filed on Feb. 18, 2011.

(51) Int. Cl.
*F03B 3/14* (2006.01)
*F03B 13/24* (2006.01)
(Continued)

(52) U.S. Cl.
CPC *F01D 7/00* (2013.01); *F01D 17/16* (2013.01); *F03B 13/142* (2013.01); *F03B 15/00* (2013.01); *Y02E 10/32* (2013.01); *Y02E 10/38* (2013.01); *Y02E 10/28* (2013.01)
USPC .......... 416/136; 416/144; 416/168 R

(58) Field of Classification Search
CPC ......... Y02E 10/32; Y02E 10/38; Y02E 10/28; F05B 2210/404; F05B 2260/78; F05B 2280/6012; F03B 13/142; F03B 13/24; F03B 3/14; F03B 15/00; F05D 2210/44; F05D 2300/612; F01D 7/00; F01D 17/16

USPC .......... 415/3.1, 133, 141, 140, 905, 906, 909; 416/24, 79, 80, 81, 82, 117, 131, 136, 416/137, 144, 164, 168 R, DIG. 4, DIG. 8; 290/42, 43, 53, 54
See application file for complete search history.

(56) References Cited

U.S. PATENT DOCUMENTS 2,400,649 A * 5/1946 Larsen ........................ 416/226
2,832,895 A * 4/1958 Hutter .......................... 290/44
(Continued)

FOREIGN PATENT DOCUMENTS

JP 2009192005 A * 8/2009
KR 1020090108120 A 10/2009
(Continued)

OTHER PUBLICATIONS

International Search Report and Written Opinion dated Nov. 5, 2012, in connection with related PCT/US2012/025651, filed Feb. 17, 2012, Becker.

*Primary Examiner* — Dwayne J White
*Assistant Examiner* — Joshua R Beebe
(74) *Attorney, Agent, or Firm* — Downs Rachlin Martin PLLC

(57) ABSTRACT

An axial-flow turbine assembly that includes one or more features for enhancing the efficiency of the turbine's operation. In one embodiment, the turbine assembly includes a turbine rotor having blades that adjust their pitch angle in direct response to working fluid pressure on the blades themselves or other part(s) of the rotor. In other embodiments, the turbine assembly is deployable in an application, such as an oscillating water column system, in which the flow of working fluid varies over time, for example, as pressure driving the flow changes. In a first of these embodiments, the turbine assembly includes a valve that allows the pressure to build so that the flow is optimized for the turbine's operating parameters. In a second of these embodiments, one or more variable-admission nozzle and shutter assemblies are provided to control the flow through the turbine to optimize the flow relative to the turbine's operating parameters.

45 Claims, 10 Drawing Sheets

(51) Int. Cl.
*F01D 7/00* (2006.01)
*F01D 17/16* (2006.01)
*F03B 13/14* (2006.01)
*F03B 15/00* (2006.01)

(56) References Cited

U.S. PATENT DOCUMENTS

| | | | | |
|---|---|---|---|---|
| 4,029,434 A | * | 6/1977 | Kenney | 416/41 |
| 4,271,668 A | * | 6/1981 | McCormick | 60/398 |
| 4,274,807 A | * | 6/1981 | Kenney | 416/48 |
| 4,324,528 A | * | 4/1982 | Svenning | 416/132 B |
| 4,430,044 A | * | 2/1984 | Liljegren | 416/119 |
| 4,447,740 A | * | 5/1984 | Heck | 290/53 |
| 4,545,726 A | * | 10/1985 | Holliger | 415/26 |
| 4,582,013 A | * | 4/1986 | Holland, Jr. | 114/39.3 |
| 4,877,374 A | * | 10/1989 | Burkett | 416/136 |
| 5,005,357 A | * | 4/1991 | Fox | 60/398 |
| 5,096,381 A | * | 3/1992 | Svenning | 416/135 |
| 5,191,225 A | * | 3/1993 | Wells | 290/53 |
| 5,226,805 A | * | 7/1993 | Proven | 416/132 A |
| 5,951,249 A | * | 9/1999 | Aylor | 416/42 |
| 2002/0066269 A1 | * | 6/2002 | Denniss | 60/398 |
| 2009/0263244 A1 | | 10/2009 | Presz, Jr. et al. | |
| 2009/0317230 A1 | * | 12/2009 | Tease et al. | 415/1 |
| 2010/0007148 A1 | | 1/2010 | Davis et al. | |
| 2010/0025996 A1 | * | 2/2010 | Edwards et al. | 290/44 |
| 2011/0103958 A1 | * | 5/2011 | Arlitt et al. | 416/205 |
| 2011/0142656 A1 | * | 6/2011 | Arlitt et al. | 416/204 R |
| 2011/0272945 A1 | * | 11/2011 | Ortiz | 290/53 |
| 2012/0124986 A1 | | 5/2012 | Carter | 60/398 |

FOREIGN PATENT DOCUMENTS

WO  WO 2009071150 A2 * 6/2009
WO  WO 2009098007 A2 * 8/2009
WO  2009142523 A3  11/2009

* cited by examiner

US 8,974,184 B2

TURBOMACHINERY HAVING SELF-ARTICULATING BLADES, SHUTTER VALVE, PARTIAL-ADMISSION SHUTTERS, AND/OR VARIABLE PITCH INLET NOZZLES

RELATED APPLICATION DATA

This application claims the benefit of priority of U.S. Provisional Patent Application Ser. No. 61/444,225, filed on Feb. 18, 2011, and titled "Self-Actuated Blade Articulation Mechanism for and Oscillating Water-Air Column," which is incorporated by reference herein in its entirety.

FIELD OF THE INVENTION

The present invention generally relates to the field of turbomachinery. In particular, the present invention is directed to turbomachinery having self-articulating blades, shutter valve, partial admission shutters, and/or variable-pitch inlet nozzles.

BACKGROUND

Water-wave energy has 15 to 20 times more energy per square meter than wind or solar, and oscillating water column (OWC) wave energy conversion systems have the highest potential of all of the conceived energy converters to provide this renewable energy in the form of electric power. It is well known by researchers that the efficiency of the air turbines used in OWC systems can be improved by adjusting the pitch, or the attack-angle, of the turbine blades to best match the air and blade surface velocities, thus increasing the aerodynamic blade lift and rotor torque. All existing variable pitch control systems rely on electric/pneumatic/hydraulic feedback control systems to actuate the blade pitch. However, these conventional approaches are mechanically complex, unreliable, and costly.

During operation of an OWC system, air pressure within an air chamber oscillates with the water waves as they pass through the chamber. The pressure of the air entrapped in the chamber is forced out of the chamber through one or more air turbines as the peak of a wave passes through the chamber, and air is drawn into the chamber, for example, through the same turbine(s), as the trough of a wave passes through the chamber. The magnitude of the pressure and the flow rate of the air is a non-linear function of the amount of potential energy in the incident wave, and these magnitudes are constantly varying with time during the waves' interaction with the OWC structure. The constantly varying pressures within OWC systems make it challenging to optimize their performance.

SUMMARY OF THE DISCLOSURE

In one implementation, the present disclosure is directed to a turbomachine. The turbomachine includes a turbine comprising a rotor having a rotational axis and designed and configured to be driven by a working fluid, the turbine comprising a rotor that includes a blade support designed and configured to rotate about the rotational axis, and a plurality of self-articulating-blade assemblies engaged with the blade support and each including a blade having a leading edge and a pivot axis extending substantially parallel to the leading edge, and an articulation mechanism engaged with the blade in a manner that controls pivoting of the blade about the pivot axis in response to changes in pressure of the working fluid.

In another implementation, the present disclosure is directed to an oscillating water column (OWC) system. The OWC includes a structure containing a wave-air chamber designed and configured to provide an air-filled region of variable volume as one or more water-waves pass through the wave-air chamber, the structure including an opening to air outside the structure when the OWC system is deployed, a turbine-generator unit that includes an electrical generator, and an air turbine that includes a rotor mechanically coupled to the electrical generator in a manner that the rotor drives the electrical generator during operation of the OWC system, the rotor operatively positioned so that it is driven by air passing through the opening during operation of the OWC system, the rotor including an airfoil having a leading edge and a pivot axis extending substantially parallel to the leading edge, and an articulation mechanism engaged with the airfoil in a manner that controls pivoting of the airfoil about the pivot axis in direct response to changes in pressure of the air on a part of the rotor.

In still another implementation, the present disclosure is directed to an oscillating water column (OWC) system. The OWC includes a structure containing an air-water chamber designed and configured to receive water waves in a manner that changes the volume of air within the air-water chamber during operation, wherein the structure includes an opening between the air-water chamber and an air environment outside the chamber when the structure is deployed, an air-turbine mounted in the opening and designed and configured to be driven by air flowing through the opening during operation of the OWC system, a valve located in the opening and designed and configured to modulate the flow of air through the air-turbine during operation of the OWC system, and a control system designed and configured to modulate the valve in a manner that allows pressure within the air-water chamber to build to a predetermined magnitude before opening the valve.

In yet another implementation, the present disclosure is directed to a partial-admission axial-flow turbine assembly. The partial-admission axial-flow turbine assembly includes a first annular working-fluid flow region, a turbine-rotor having a plurality of blades located in the first annular working-fluid flow region, and a first nozzle and shutter assembly having a second annular working-fluid flow region spaced from the first annular working-fluid flow region and including a first plurality of articulatable nozzle blades disposed in a first portion of the second annular working-fluid flow region, and a first plurality of articulatable shutter blades disposed in a second portion of the second annular working-fluid flow region.

In still yet another implementation, the present disclosure is directed to a method of optimizing efficiency of an air-turbine in an oscillating water column (OWC) system, wherein the air-turbine is designed for an optimal air flow. The method includes providing a valve designed and configured to control flow of air through the air-turbine, monitoring at least one condition inside an air-water chamber of the OWC system, and modulating the valve as a function of the at least one condition in a manner that maximizes the time that the air-turbine receives the optimal air flow.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

In one aspect, the present disclosure is directed to turbomachinery having enhanced performance and efficiency. To readily illustrate various features of the present invention, the unique turbomachinery is primarily described below in the context of oscillating water column (OWC) applications. However, those skilled in the art will appreciate that turbomachinery incorporating one or more of the features disclosed herein can be used in applications other than OWC applications. Those skilled in the art will understand how to adapt the broad features taught in this disclosure to each of those alternative applications using only knowledge that such skilled artisans possess.

Self-Articulating Blades

Figure 1:
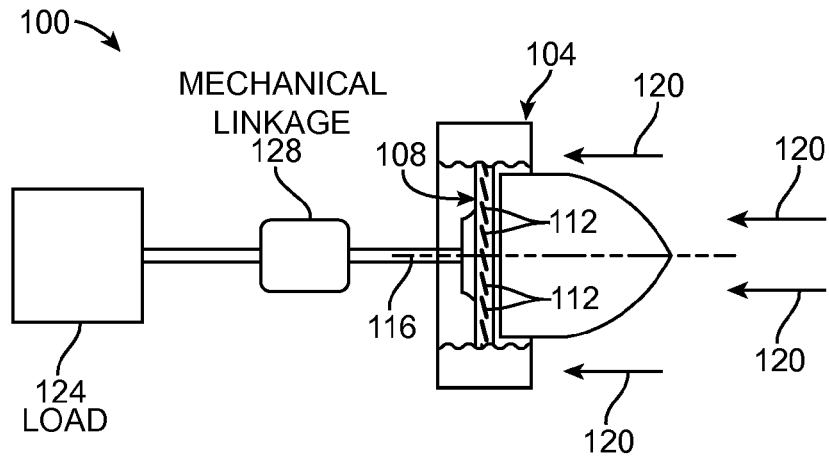
FIG. 1 is a block/partial cutaway schematic diagram of a turbine-based system having self-articulating blades.

Referring now to the drawings, FIG. 1 illustrates a turbine-based system 100 that includes a turbine 104 incorporating a first feature of the present invention, i.e., a rotor 108 having self-articulating blades 112. By "self-articulating" it is meant that each blade 112 pivots about a rotational axis 116 in a predetermined manner in response to pressure exerted by a working fluid 120 on that blade and/or on one or more other parts of rotor 108. Importantly, this self-articulating feature is a passive, direct-response feature that does not require any feedback control and corresponding active feedback control systems, which tend to be complex, costly, and prone to failures. As will be seen below, in some embodiments, the self-articulating feature involves each blade 112 pivoting in direct response to the pressure of the working fluid on that blade, while in other embodiments, the self-articulating feature involves one or more blades pivoting in direct response to pressure of the working fluid on one or more pressure panels (not shown in FIG. 1, but see FIGS. 8A and 8B) that are part of rotor 108 and are mechanically linked to the blade(s).

As those skilled in the art will readily appreciate, each blade 112 can have any design and shape suitable for the application of turbine 104 and the type of turbine. In the OWC-based examples below in which air is working fluid 120 and the flow of air is bidirectional as air is alternatingly forced out of and drawn into the OWC chamber, turbine 104 is a Wells-type turbine having symmetrical airfoil-style blades. However, in other applications, turbine 104 does not need to be of the Wells type, nor do blades 112 have to be symmetrical and airfoil style. Those skilled in the art will readily be able to select the proper turbine type and blade style(s) for the application at hand.

Turbine-based system 100 also includes a load 124 that is mechanically linked to rotor 108 by a mechanical linkage 128 and driven by turbine 104. Of course, the type of load 124 will vary with the application, but exemplary loads include electrical generators, rotary pumps, reciprocating pumps, rotary compressors, reciprocating compressors, among others. Mechanical linkage 128 can be, for example, a direct-drive drivetrain, a rotational-output transmission, a linear-output transmission, or any other suitable mechanical linkage needed. Those of ordinary skill in the art will readily be able to select and design a suitable mechanical linkage based on the load(s) at issue.

Figure 2:
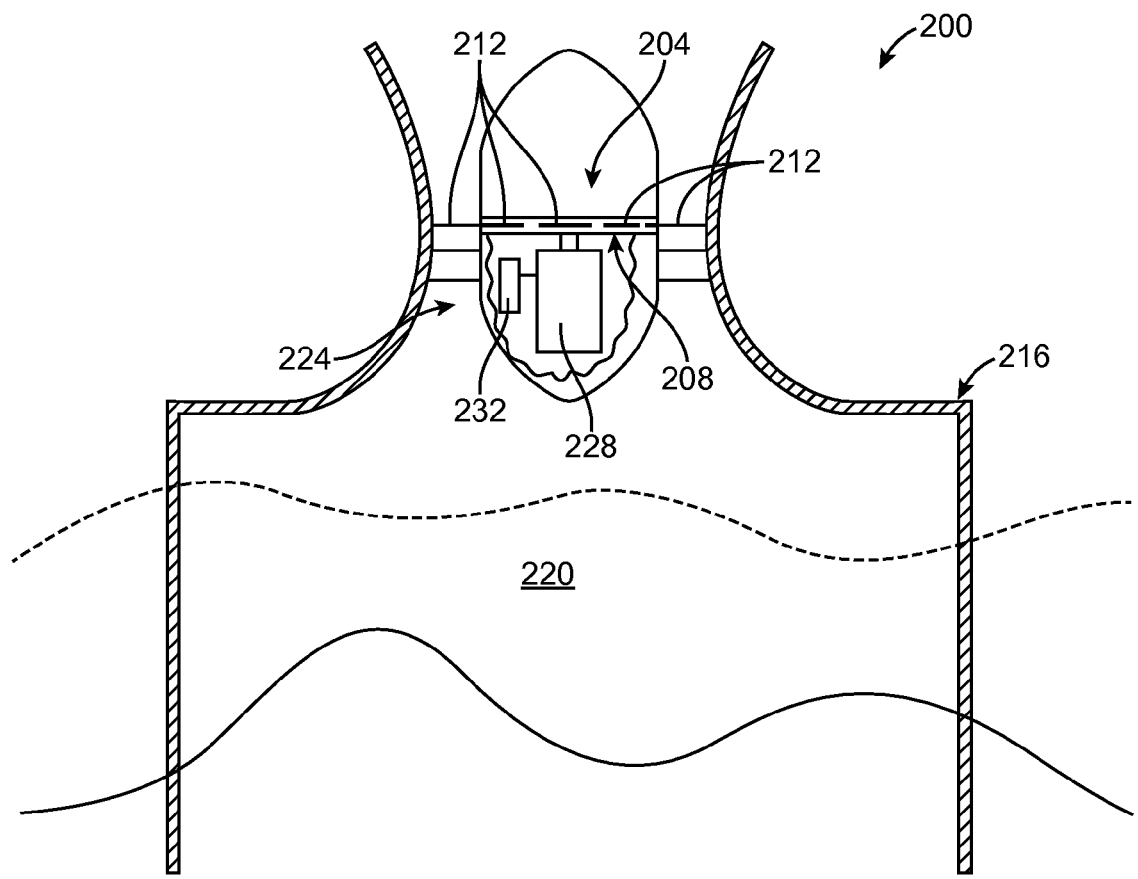
FIG. 2 is an elevational view/partial cutaway of an example of the turbine-based system of FIG. 1 embodied in an oscillating water column (OWC) electrical power generating system.

FIG. 2 illustrates an OWC-based electrical power generation system 200 made in accordance with the present invention. In particular, system 200 includes an air-turbine 204 that includes a rotor 208 having self-articulating blades 212. Before describing self-articulating blades 212 and some exemplary alternatives, other components of system 200 are first described to provide the reader with context. In addition to air-turbine 204, OWC-based system 200 includes a superstructure 216 that defines an air-water chamber 220 through which water-waves pass to creating oscillating air pressure within the chamber. Superstructure 216 includes an opening 224 in which air-turbine 204 is mounted. As is well known in the field of OWC-based electrical generation systems, the passage of waves through air-water chamber 220 will cause air to be forced out through opening 224 as rising waves increase the pressure within the chamber and cause air to be drawn into the chamber through the opening as descending waves decrease the pressure within the chamber. In the present example, air-turbine 204 is a Wells-type turbine in which rotor 208 is designed to continuously spin in one direction and extract energy from the flow of air through opening 224 regardless of whether the air flow is into or out of air-water chamber 220. Generally, a Wells-type turbine is a turbine in which the turbine blades, here blades 212, are airfoils having symmetry about their chords.

OWC-based electrical power generation system 200 also includes an electrical generator 228 that is driven by air-turbine 204. In this example, electrical generator 228 is directly driven by air-turbine 204, and system 200 further includes power electronics 232 to control the operation of the generator and to condition the electrical output of the system. The particulars of power electronics 232 are generally beyond the scope of this disclosure, and those skilled in the art will understand how to design and implement such power electronics for a given system. That said, it is noted that because air-turbine 204 is a Wells-type turbine in this example, power is initially needed to spin turbine rotor 208 up to a critical speed at which the rotor will be able to be driven only by air flow into and out of opening 224. In one example, power electronics 232 can be used to drive generator 228 so that it acts as a motor to spin turbine-rotor 208 up to the critical speed. However, in other embodiments, a secondary, or pony, motor can be used, as known in the art. Much more information concerning the general operation of OWC-based electrical power generating systems can be found in a variety of sources, such as the provisional application cited above that is the priority document hereto, i.e., U.S. Provisional Patent Application Ser. No. 61/444,225, filed on Feb. 18, 2011, and titled "Self-Actuated Blade Articulation Mechanism for and Oscillating Water-Air Column" (hereinafter "the '225 application"), which is incorporated herein by reference for its teachings on OWC systems, Wells-type turbines, and self-articulating blades.

Figure 3A:
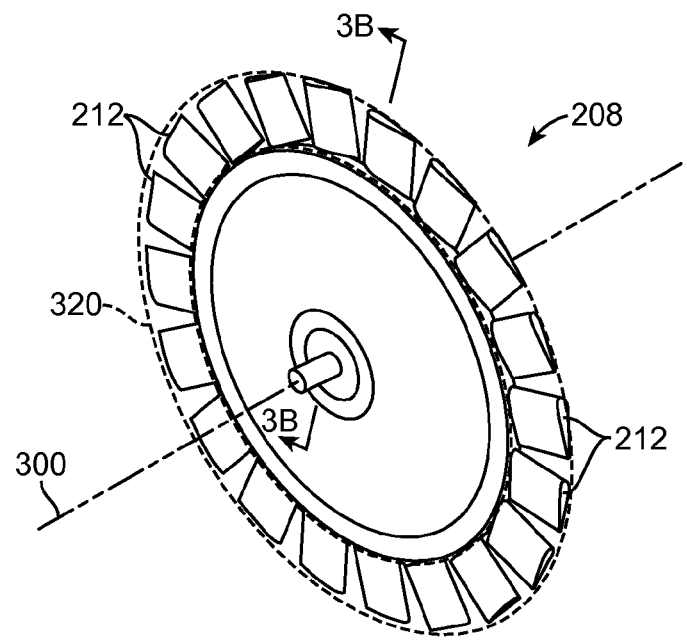
FIG. 3A is an enlarged perspective view of the turbine rotor of the OWC system of FIG. 2.
Figure 3B:
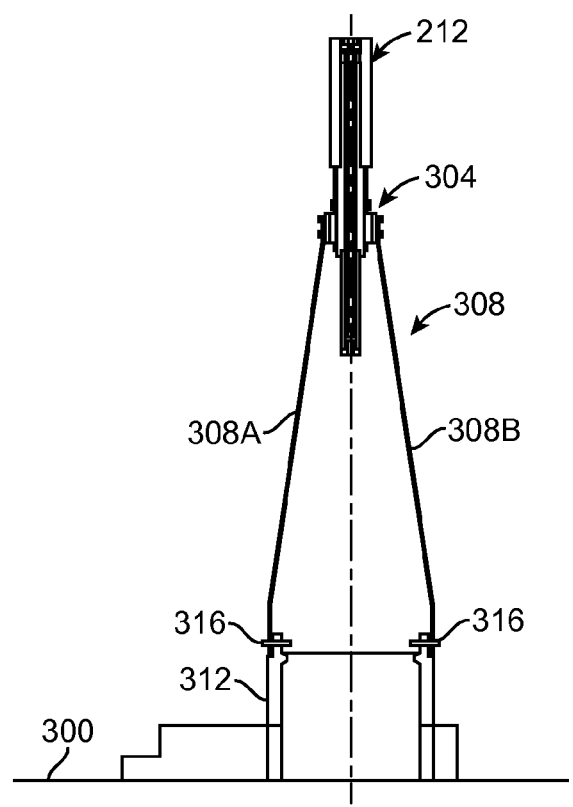
FIG. 3B is an enlarged cross-sectional view of the turbine rotor as taken along line 3B-3B of FIG. 3A.

Referring now to FIGS. 3A and 3B, these figures illustrate important features of turbine rotor 208 of FIG. 2 in detail. As seen in FIG. 3A, rotor 208 is designed to rotate about a rotational axis 300 and includes 20 self-articulating blades 212 (only a few are labeled in FIG. 3A), and as seen in FIG. 3B, each blade is part of a corresponding self-articulating blade assembly 304, which is described below in detail. Rotor 208 also includes a blade support 308 that supports each self-articulating blade assembly 304. In this example, blade support 308 comprises a pair of spaced disks 308A, 308B that are utilized to minimize the rotational mass of rotor 208. Depending on the diameter of rotor 208, each disk 308A, 308B can be, for example, a lightweight metal stamping, or other lightweight structure. For larger rotors, if disks 308A and 308B are made of metal, they may need to be cast. As described below, in addition to blade support 308 being lightweight, in this OWC application each blade 212 also has a lightweight design that contributes to the efficiency of air-turbine 204 (FIG. 2). Blade supports 308A, 308B are attached to a hub 312, for example, using mechanical fasteners 316 for ease of assembly.

In this example, hub 312 and blade support 308 are solid structures in terms of air flowing through air-turbine 204 (FIG. 2) during operation. In addition, blades 212 (FIG. 3A) have a high solidity within the annulus 320 (FIG. 3A) through which the blades sweep when rotor 208 is rotating about rotational axis 300. In this example, the blade solidity is about 65%, meaning that about 65% of annulus 320 is occluded by blades 212 and about 35% is open space between adjacent blades. In the embodiment shown, the approximately 35% open space is due primarily to the largely rectangular shape of blades 212 and their radial orientations. The blade solidity can be increased by reducing the open spaces between adjacent blades 212, for example, by designing the blades so that adjacent leading and trailing edges are closer together. By doing so, blade solidity can be increased to nearly 100%.

For the present OWC-based application, high blade solidity can be desirable, especially in conjunction with self-articulating blades 212. This is so because high blade solidities, e.g., blade solidities ranging from about 60% to about 100%, in conjunction with overall high rotor solidity (such as in the case of solid blade support 308 and hub 312 (again, in terms of air flow)) can lead to quicker pressure build up (positive or negative) within air-water chamber 220 (FIG. 2), and higher pressure differences from the upstream side of rotor 208 to the downstream side, thereby leading to higher efficiency and performance of blades 212. The self-articulation of blades 212 also assists in this pressure building by causing a delay in the opening (i.e., pivoting) of the blades that allows the pressure to build.

Self-articulating blade assemblies 304 are secured to blade support 308 using any suitable fastening means, such as the threaded fasteners 316 shown in FIG. 3B. In this embodiment, each self-articulating blade assembly 304 is a self-contained unit. If a particular one of self-articulating blade assemblies 304 should happen to fail, making these assembles easily removable, such as by using threaded fasteners 316, allows the failed assembly to be readily replaced.

Figure 4:
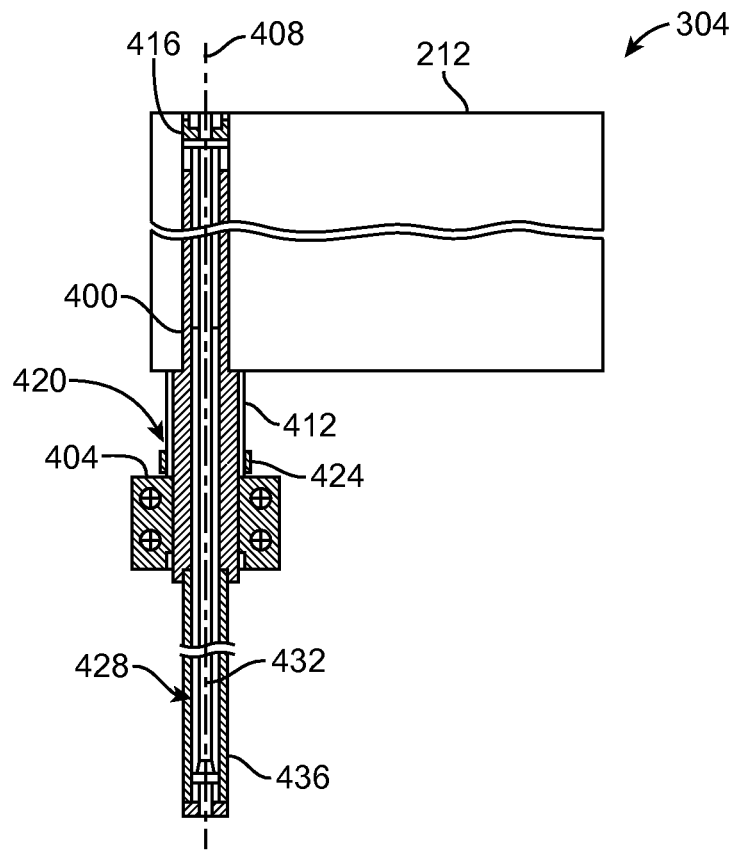
FIG. 4 is an enlarged cross-sectional view of one of the self-articulating blade assemblies of the turbine rotor of FIGS. 2, 3A, and 3B.

FIG. 4 illustrates one of self-articulating blade assemblies 304 in detail; in this example, all of the assemblies are alike. Referring to FIG. 4, self-articulating blade assembly 304 includes a cantilevered spindle 400 and a bracket 404 that is used to fixedly attach the spindle to blade support 308 (FIGS. 3A and 3B). Blade 212 is pivotably engaged with spindle 400 so that it can pivot about a corresponding pivot axis 408. In this example, a lubricant (not shown), such as a grease, is provided on the inside of a lubricant-containment jacket 412 that envelops spindle 400 and extends between a first seal 416 at the radially outward end of blade 212 and a second seal 420 adjacent to bracket 404. Second seal 420 can be effected using a suitable clamp 424. With the lubricant sealed within lubricant-containment jacket 412, it poses no risk to the sensitive air and water environment of OWC-based system 200 (FIG. 2). In the embodiment shown, the articulation range of blade 212 is approximately ±15° from a neutral position (see below). With such a relatively small range of motion, lubricant-containment jacket 412 can be, for example, a flexible polymer sleeve.

Self-articulating blade assembly 304 also includes a biaser 428 that biases blade 212 to a base position and that, when the blade is under the influence of a net pressure on one of its faces from the working fluid, allows the blade to pivot about pivot axis 408 by a controlled amount for the magnitude of the net pressure. In this example, biaser 428 comprises a torsion rod 432 that is fixed at one end to blade 212 and fixed at the opposite end to an extension tube 436, which is fixed relative to spindle 400 and bracket 404. With torsion rod 432 fixed thusly at both ends, net pressure applied to blade 212 on either of its faces causes the blade to pivot and the torsion rod to twist, and the amount and direction of pivoting and twisting varies with the magnitude and direction of the net pressure applied to the blade. The pivoting of blade 212 decreases its angle of attack relative to the effective air flow through annulus 320 (FIG. 3A), making air turbine 204 (FIG. 2) more efficient and more effective across a wider range of air-flows. Information on the efficiencies and operating ranges of air flow versus blade attack angle can be found in a number of sources, including the '225 application, which is incorporated herein for its descriptions of same, and references cited therein. It is noted that extension tube 436 used in this example is provided to optimize the biasing effects of torsion rod 432. Other torsion-rod-based embodiments of self-articulating blade assemblies made in accordance with the present invention might use a torsion rod of different length that require either a differently sized extension tube or no tube at all.

In the embodiment shown and as mentioned above, self-articulating blade assembly 304 is designed and configured to pivot about pivot axis 408 in either of two directions, depending on whether the air is flowing into or out of air-water chamber 220 (FIG. 2). Consequently, the base position into which blade 212 is biased is a neutral position between these two directions. In this example, the neutral position is a position in which the chord of the corresponding blade 212 (airfoil) lies in a plane that is perpendicular to rotational axis 300 (FIGS. 3A and 3B) of rotor 208. However, in other embodiments (not shown), such as a turbine wherein the working fluid always flows from only one direction, the base position may be a position in which the blade or other member is biased into engagement with a stop, such that the blade can pivot only in one direction from the base position.

Figure 5A:
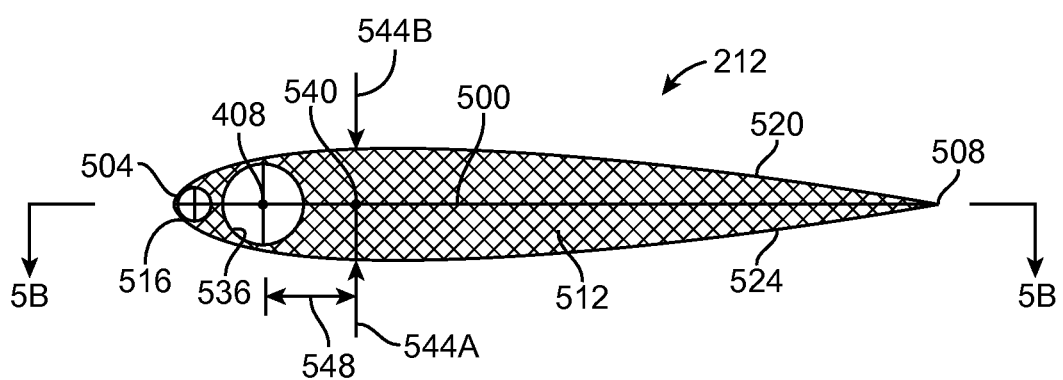
FIG. 5A is a longitudinal cross-sectional view of the blade of FIG. 4.
Figure 5B:
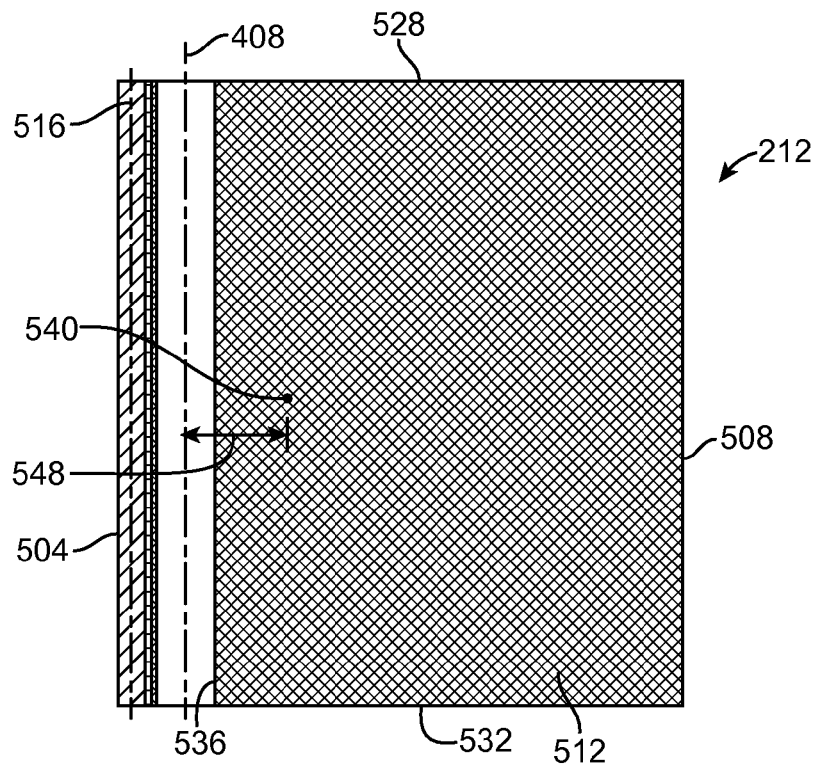
FIG. 5B is a cross-sectional view of the blade as taken along line 5B-5B of FIG. 5A.

Referring now to FIGS. 5A and 5B, these figures show one of blades 212; all blades of turbine rotor 208 (FIG. 2) are identical to one another. Again, with this example being a blade for a Wells-type turbine, blade 212 is an airfoil that is symmetrical about a chord 500 (FIG. 5A) extending from the blade's leading edge 504 to its trailing edge 508. Those skilled in the art will appreciate that blade 212 can be asymmetrical in other embodiments and can be a hydrofoil or otherwise be designed and configured for the working fluid and application at issue. For convenience, the appended claims use the term "air/hydrofoil" to describe a blade having the profile of an airfoil, a hydrofoil, or like device having fluid-dynamic profile similar to the fluid-dynamic profiles of airfoils and hydrofoils suitable for use in turbines of the sort contemplated by the present disclosure. As mentioned above, a consideration for this application was to make blade 212 as lightweight as possible while maintaining structural integrity. In addition to minimizing the weight of blade 212, another consideration was to located the center of gravity of the blade as close to pivot axis 408 as practicable. This is required in order to reduce the bending moments on the spindle (about which the air foil pivots) due to centrifugal forces. Such large moments must otherwise be mechanically supported by larger diameter torsional shaft which then may be too stiff to provide the necessary torsional flexibility. The design as presented succeeds in providing a balance between the necessary torsional stiffness and the necessary structural integrity. This resulted in providing blade 212 with a relatively low density between pivot axis 408 and trailing edge 508 and with a relatively high density between leading edge 504 and the pivot axis.

In the example shown, the regions of low and high density within blade 212 were achieved, respectively, using low-density rigid foam 512 for the core of the blade and adding a lead rod 516 between leading edge 504 and pivot axis 408. The entirety of blade 212 is covered with a relatively thin skin of suitable material, such as stainless steel, aluminum, or other material that is resistant to the corrosive (salt-)water environment in which OWC-based electrical power generating system 200 (FIG. 2) will be deployed. In one specific example, blade 212 is an NACA 0015-proportioned symmetrical airfoil, as designated by the National Advisory Committee for Aeronautics (NACA), and is covered with a 0.1 mm thick stainless steel skin on its facial surfaces 520, 524, respectively, and 1 mm thick stainless steel skin on radially inward and outward ends 528, 532, respectively. In this example, blade 212 also includes a pivot tube 536 that slidingly engages spindle 400 (FIG. 4), and lead rod 516 is a 26 mm diameter rod secured to the pivot tube. Foam 512 used in the exemplary blade 212 has a density of 0.025 g/cm$^3$. In this example in which blade 212 has a chord length of 250 mm and each of leading and trailing edges 504 and 508 has a length of 280 mm, the weight of the blade is about 1,300 g.

As seen in FIG. 5A and FIG. 5B, the pressure of the working fluid, here air, resolves to provide a center of pressure 540, for the net pressure as applied from either side of blade 212, that is located between pivot axis 408 and trailing edge 508. It is largely the resolved pressure forces 544A, 544B working at the moment arm 548 that generates the twist in torsion rod 432 (FIG. 4) and the self-actuated pivoting of blade 212 about pivot axis 408. Based on modeling and experimentation, it appears that for an NACA 0015-profiled airfoil, locating the pivot axis in a range of about 7% to about 15% of the chord length from the leading edge of the blade provides good results in a torsion-bar implementation. For an NACA 0020-profiled airfoil, this range appears to reduce to about 7% to about 13%, at least for the modeled situation. Nose-weighting appears to make torsion-bar implementations more feasible for heavier blades.

Figure 6:
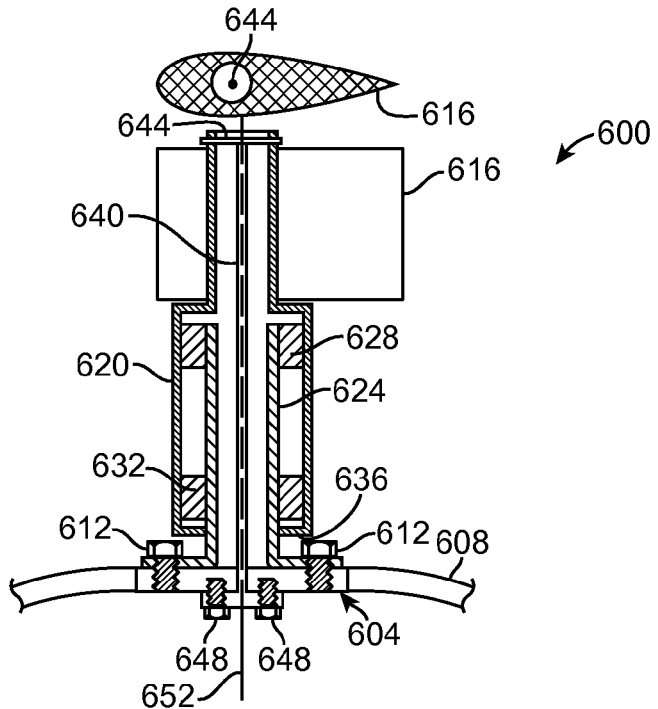
FIG. 6 is a cross-sectional view of an alternative self-articulating blade assembly in which the pivoting of the blade is cause by working-fluid pressure on the blade.

FIG. 6 illustrates an alternative torsion-rod-based self-articulating blade assembly 600 that can be used in a turbine, such as air-turbine 204 of FIG. 2. In this alternative, instead of rotor 604 sandwiching a mounting bracket between two plate-like members as in rotor 208 of FIGS. 3A and 3B, rotor 604 of FIG. 6 has a cylindrical blade support 608 that supports self-articulating blade assembly 600, here, via threaded fasteners 612 that make the assembly easy to install, remove, and replace. Self-articulating blade assembly 600 includes a blade 616 that is rigidly secured to an axle 620, which is pivotably engaged with a pivot post 624 that is fixed to blade support 608 with fasteners 612. A pair of rotational bearings 628, 632 are disposed between pivot post 624 and axle 620, and a lubricant seal 636 is provided to inhibit the lubricant (not shown) for the bearings from contaminating the environment. A torsion rod 640, which serves as a biaser largely in the manner of torsion rod 432 of FIG. 4, is fixedly secured to blade axle 620 at its radially outward end (here, with a pin 644) and fixedly secured to blade support 608 at its radially inward end (here, with threaded fasteners 648). As can be readily appreciated, pivoting of blade 616 about pivot axis 652 by working-fluid pressure applied to the blade causes torsion rod 640 to twist, thereby resisting rotation of the blade in a controlled manner to provide the blade with an optimal angle of attack for that pressure of working fluid. Blade 616 can be any suitable airfoil, hydrofoil, or other design suitable for the application at hand.

Figure 7:
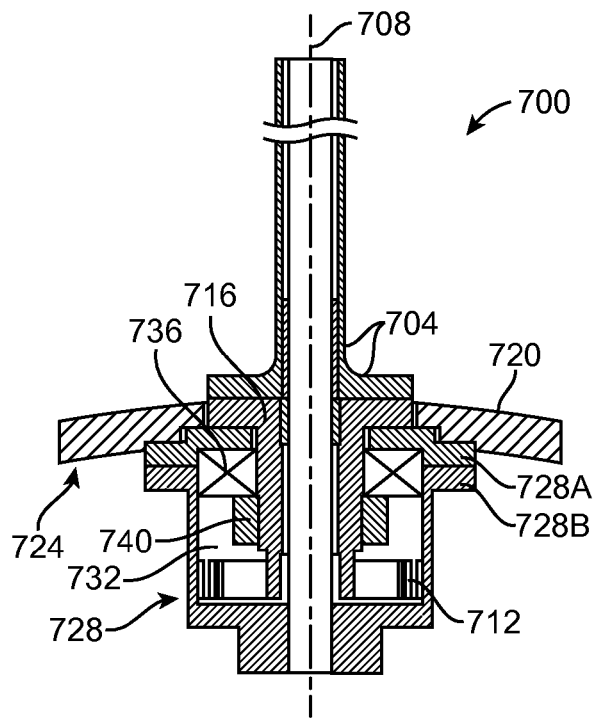
FIG. 7 is a cross-sectional view of another alternative self-articulating blade assembly in which the pivoting of the blade is cause by working-fluid pressure on the blade.

FIG. 7 illustrates another self-articulating blade assembly 700 that allows blade 704 to pivot about a pivot axis 708 in direct response to working-fluid pressure applied to the blade. This example differs from the previous two examples in that the biaser comprises one or more springs 712 (not of the torsion-rod type), such as one or more spiral springs, one or more helical springs, one or non-cantilever springs, etc., rather than a torsion rod to provide the biasing forces. In addition to blade 704 and spring(s) 712, self-articulating blade assembly 700 includes a pivoting blade-base 716 that allows the blade to pivot relative to a blade support 720 (which is part of a turbine rotor 724) about pivot axis 708. Blade-base 716 is pivotably engaged with a two-part housing 728 that is fixedly attached to blade support 720, for example, using threaded fasteners to allow for relatively easy installation, removal, and replacement. Housing 728 includes a first part 728A and a second part 728B that define a chamber 732 that contains a thrust bearing 736, a locking collar 740 that bears against the thrust bearing, and spring(s) 712, each of which is fixed to the housing and pivoting blade-base 716 to provide the requisite bias for resisting rotation of blade 704 in a controlled manner to provide the blade with an optimal angle of attack for the pressure of working fluid. Chamber 732 is sealed so as to contain any lubricant (not shown) provided. Blade 704 can be any suitable airfoil, hydrofoil, or other design suitable for the application at hand.

Figure 8A:
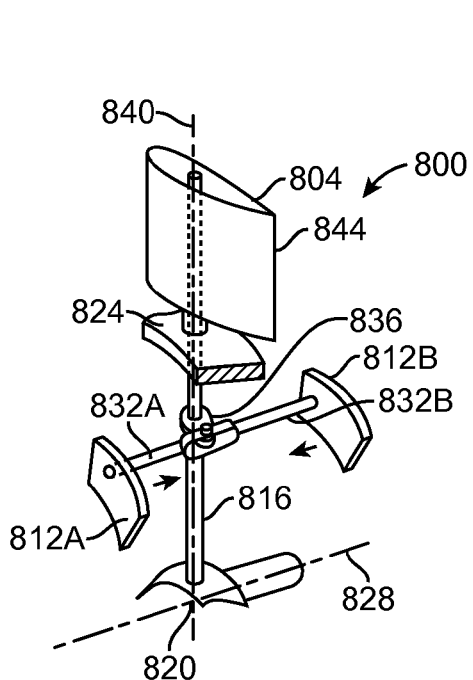
FIG. 8A is a perspective partial view of still another alternative self-articulating blade assembly in which the pivoting of one or more blades is caused in part by working-fluid pressure on pressure panels movably engaged with the turbine rotor.
Figure 8B:
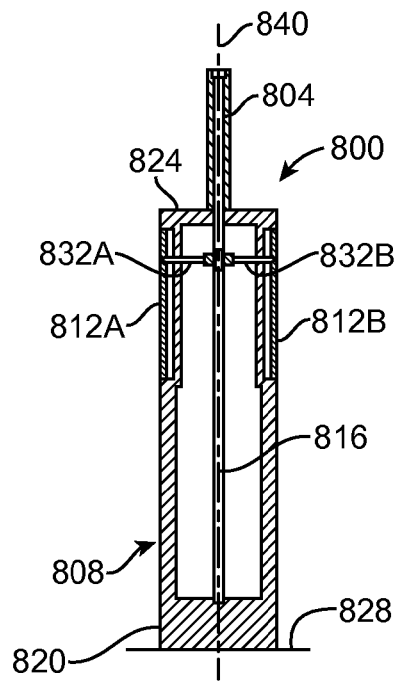
FIG. 8B is a cross-sectional partial view of the self-articulated blade assembly of FIG. 8A, showing the assembly engaged with a rotor.

FIGS. 8A and 8B illustrate a self-articulating blade assembly 800 that operates differently from self-articulating blade assemblies 304, 600, and 700 described above. As described above, each of self-articulating blade assemblies 304, 600, and 700 work by pivoting the corresponding respective blades 212, 616, and 704 in direct response to only the net pressure of the working fluid acting on those blades. In contrast, self-articulating blade assembly 800 of FIG. 8 works, at least in part, by pivoting blade 804 in direct response to the net pressure of the working fluid acting on one or more parts of rotor 808 other than the blade. In this example, rotor 808 is designed and configured for a Wells-type turbine, such as air-turbine 204 of FIG. 2, wherein the net pressure of the working fluid alternatingly acts from one side of rotor 808 (FIG. 8B) or the other, depending on the direction of the flow of the working fluid through the turbine.

Consequently, in this example, self-articulating blade assembly 800 includes a pair of pressure panels 812A and 812B, one on each side of rotor 808, movably attached to the rotor so that they move in direct response to the net pressure applied to them by the working fluid during operation of the turbine. Self-articulating blade assembly 800 also includes an axle 816 to which blade 804 is fixedly secured and that is pivotably engaged with other parts of rotor 808, such as a hub 820 and an outer support ring 824 that are both concentric with the rotational axis 828 of the rotor. In this example, pressure panels 812A and 812B are mechanically linked to axle 816 by corresponding linkages 832A and 832B and a pivot arm member 836 such that when pressure panels 812A and 812B move in direct response to the net pressure of the working fluid applied to them, they pivot axle 816 and blade 804 via linkages 832A and 832B and pivot arm member 836.

As those skilled in the art will readily appreciate, the magnitude of the pivoting moment applied to axle 816 can be adjusted in any one or more of a number of ways, such as by adjusting the length of pivot arm member 836 or adjusting the sizes of pressure panels 812A and 812B, or adjusting both to suit the moment needed to pivot blade 804. In this connection, it was mentioned above that blade 804 is pivoted at least in part via the net working-fluid pressure applied to pressure panels 812A and 812B. That was mentioned because the pivot axis 840 of blade 804 can be located to be coincident with the center (not shown) of the net pressure of the working fluid on the blade or it can be located so as to be offset from the center of pressure. When pivot axis 840 and the center of pressure are coincident, the net pressure does not tend to pivot blade 804, whereas when the pivot axis is offset from the center of pressure, the offset causes the net pressure to tend to pivot the blade. When the center of pressure is located between pivot axis 840 and trailing edge 844 (FIG. 8A) of blade 804, with the arrangement shown in FIGS. 8A and 8B the net pressure on pressure panels 812A and 812B and the net pressure on the blade work in concert to pivot the blade in the same direction. It should be understood that a designer can tune the location of pivot axis 840 relative to the center of pressure on blade 804 as needed to achieve the desired results.

Depending on the various design parameter and constraints, any one or more of a variety of modifications could be made to exemplary self-articulating blade assembly 800 shown in FIGS. 8A and 8B. For example, one or more biasing means can be used to resist pivoting of blade 804 about pivot axis 840 to achieve the desired pivoting response and angles of blade attack. As specific examples, such biasing means could be one or more springs (helical, spiral, cantilever, torsional, etc., and/or axle 816 itself could be rotationally fixed to hub 820 so that it acts as a torsion rod between the hub and pivot arm member 836 to provide the desired/necessary bias.

FIGS. 8A and 8B at least suggest that each blade 804 has its own pair of pressure panels 812A and 812B. While this can be the case for certain embodiments, pressure panels 812A and 812B can be designed and configured to actuate two or more blades on the rotor. For example, pressure panels 812A and 812B could be annular and continuous around the entirety of rotor 808 and actuate all of the blades on the rotor simultaneously. Alternatively, such an annular arrangement of pressure panels 812A and 812B can be segmented such that each segment actuates a corresponding subset of all of the blades on rotor 808. Each pressure panel 812A, 812B need not be annular, but rather can be any other suitable shape, such as generally pie-shaped when segmented, or shaped like a complete disk if un-segmented. In other applications in which the working fluid flows in only one direction, the pressure panel(s) may be provide only on the upstream side of the rotor.

Shutter Valve

As discussed above relative to OWC system 200 of FIG. 2, it can be beneficial to allow pressure to build inside of air-water chamber 220 to increase the efficiency and performance of air-turbine 204 by forcing the turbine to operate closest to its design point flow rate and overall pressure drop. As also discussed above, one way of causing the pressure to build is to design the blade region of the turbine rotor, such as annulus 320 of FIG. 3A, to have a high solidity, for example, on the order of about 60% to about 100%, and allow the biasing effect of the self-articulating blade assembly provide a delay to the pivoting of the blades and, hence, the opening of the blade region to flow. While this delay allows pressure to build to a certain degree, it may be desirable to allow the pressure to build more. This building of higher pressure can be achieved, for example, by providing a valve to modulate and alternatingly block the flow of the working fluid through the turbine to allow the pressure to build to an optimal level. It is noted that such a valve can be provided to turbines regardless of whether or not they have self-articulating blades.

Figure 9A:
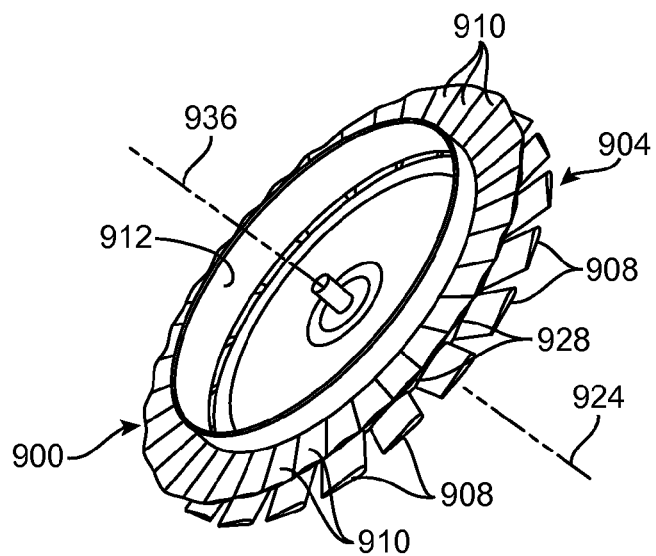
FIG. 9A is a perspective view of a shutter valve and an air-turbine rotor that can be used in an OWC system, such as the OWC electrical power generating system of FIG. 2.
Figure 9B:
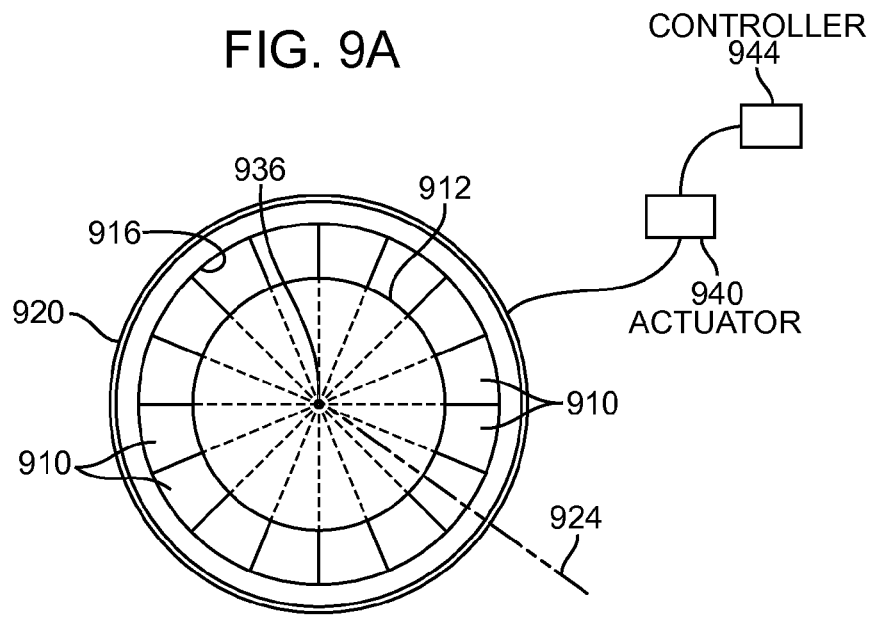
FIG. 9B is an end view of the shutter valve of FIG. 9A showing the valve in a closed configuration.
Figure 9C:
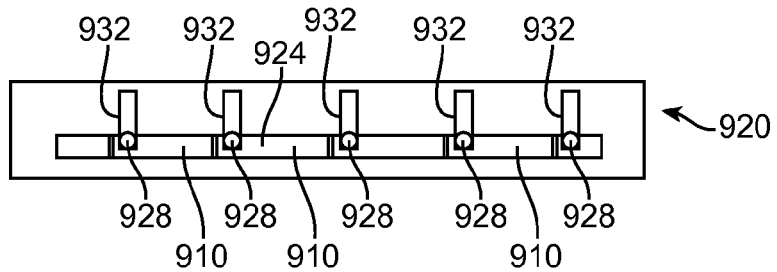
FIG. 9C is an elevational view of an outer shutter-blade actuation ring for actuating the shutter blades of the shutter valve of FIGS. 9A and 9B.

FIGS. 9A to 9C illustrate an exemplary valve, here a shutter valve 900, that can be used, for example, in an OWC system, such as OWC electrical power generating system 200 of FIG. 2. For context, FIG. 9A also shows an air-turbine rotor 904 having a plurality of blades 908 (only a few are labeled to avoid clutter). Blades 908 can be fixed, passively self-actuated, or actively actuated, as desired for a particular design. If blades 908 are self-actuated, they can be self-actuated in any of the manners described above in the previous section. Relative to OWC electrical power generating system 200 of FIG. 2, it can be readily envisioned that rotor 904 can take the place of rotor 208 in FIG. 2 and that shutter valve 900 can be located in opening 224 (FIG. 2) either above or below the rotor.

In the example, of FIGS. 9A to 9C, shutter valve 900 includes a plurality of shutter blades 910, an inner shutter-blade support ring 912 (FIGS. 9A and 9B), an outer shutter-blade support ring 916 (FIG. 9B), and a shutter-blade actuation ring 920 (FIGS. 9B and 9C). Each shutter blade 910 is pivotably supported along its pivot axis (see example at axis 924 in each of FIGS. 9A-9C) by inner and outer support rings 912 and 916 and includes a follower 928 (only a few labeled for convenience) that engages a corresponding slot 932 in actuation ring 920. In the context of deployment in system 200 of FIG. 2, inner and outer support rings 912 and 916 are fixed relative to structure 216. Each follower 928 (FIGS. 9A and 9C) is offset both laterally and vertically (relative to FIG. 9C) from the corresponding pivot axis 924, such that when actuation ring 920 is rotated about rotational axis 936 (FIGS. 9A and 9B) in a counterclockwise direction (from the starting point of closed blades 910 in FIG. 9C), followers 928 are move vertically (relative to FIG. 9C) within slots 932, thereby opening shutter valve 900. Of course, blades 910 are closed by rotating actuation ring 920 in the opposite direction. Those skilled in the art will readily appreciate that there are many ways of actuating shutter blades 910 that those skilled in the art will be able to identify and implement without undue experimentation. For example, shutter blades 910 could be actuated by either of actuation mechanisms 1500 and 1600 of FIGS. 15 and 16, respectively, with suitable modifications.

As seen in FIG. 9B, whatever type of actuation mechanism is provided to actuation shutter blades 910, that mechanism can be driven by any suitable actuator(s) 940, which could be one or more electric motors, one or more, hydraulic actuations, one or more pneumatic actuators, or any other suitable actuator(s). Actuator(s) 940 may be controlled by a controller 944, which can be designed and configured to control the actuator(s) as a function of one or more conditions relating to the air pressure within the air-water chamber, for example air-water chamber 220 of FIG. 2, such as air pressure, water-surface height, etc. If the blades of the corresponding air-turbine are self-actuating and responsive to the air pressure applied to one or more parts of the turbine's rotor, such as discussed above in connection with FIGS. 1 through 8B, controller 940 can be designed and configured to coordinate the actuation of shutter blades 910 with the delayed-opening response of such self-articulated blades to further optimize the efficiency of turbine operation.

Modeling performed by the present inventors has analytically demonstrated in an OWC scenario there is an advantage to shuttering, or closing-off, air to the air-turbine during each wave stroke. This operating principle is based on wave energy being stored in the air trapped in the OWC chamber and then allowing the air to be suddenly released through the turbine. The high air velocity and pressure is closer to or matches the air-flow rate and pressure that the air-turbine is designed to have. Prior to this work, it was known that the transient air flow begins at zero air pressure and volume flow rate and increases to a maximum during each wave stroke. Depending on the size of the OWC structure and the potential energy in the wave, the air-turbine system may not be able to recover all of the energy in the wave because the turbine typically functions better with constant flow rate and pressure. By using shuttering techniques disclosed herein, the turbine is able to operate more efficiently because the air flow rate and pressure is closer in magnitudes to the original design point of the turbine most of the time and thus the turbine can recover more wave energy.

Figure 10:
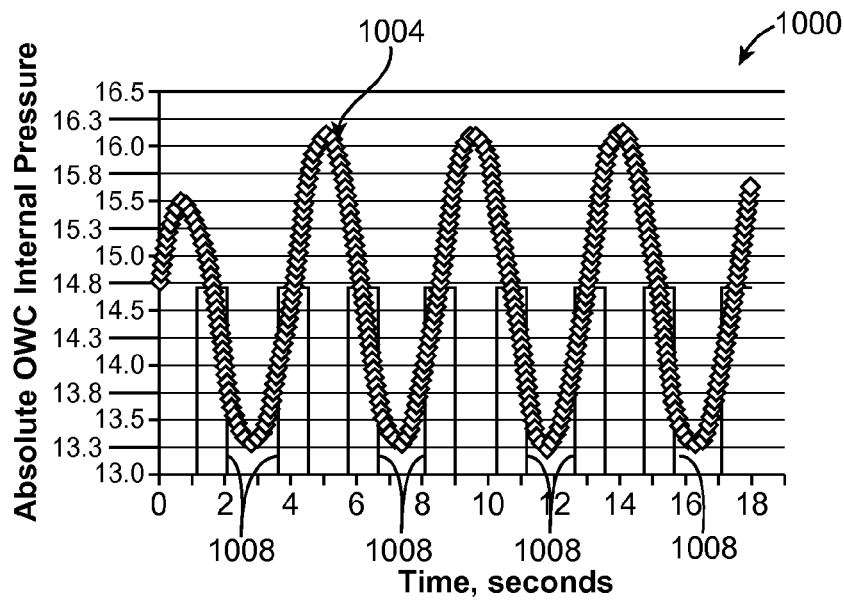
FIG. 10 is a graph of pressure inside an OWC air-water chamber and shutter-valve control signal versus time for an exemplary shuttering scenario.

FIG. 10 illustrates how shuttering, for example, using shutter valve 900, can be implemented to increase the efficiency of an air-turbine operating in an OWC setting. Referring to FIG. 10, this figure shows a combined graph 1000 of pressure variation inside an OWC air-water chamber, such as OWC air-water chamber 220 of FIG. 2, for waves having a period of 4.5 seconds and a wave height of 9.3 m (Power Density=35.5 kWe/m) versus time (sinusoidal plot 1004) and shuttering of the air-turbine using a shutter valve, such as shutter valve 900 of FIGS. 9A to 9C, versus time, wherein the time the valve is closed is represented by square waves 1008.

Figure 11:
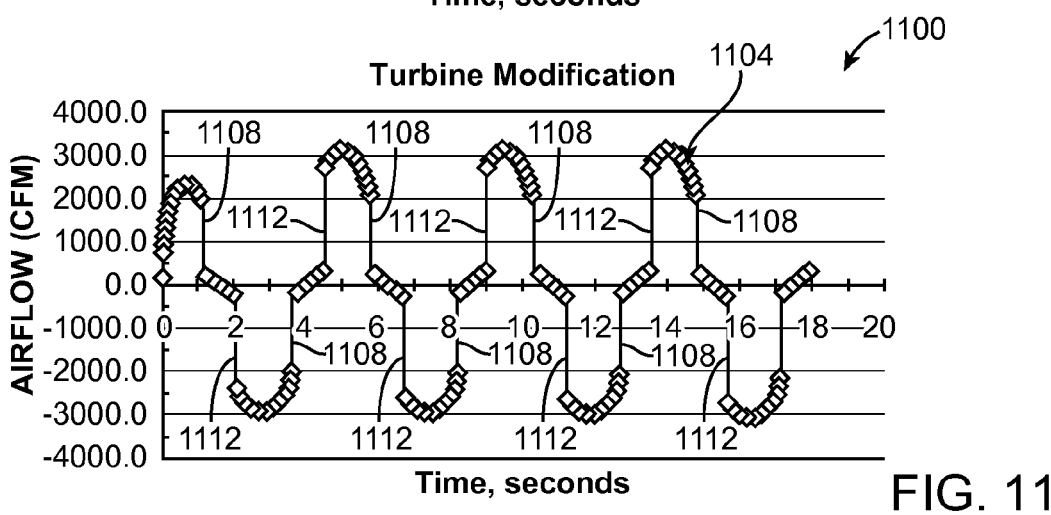
FIG. 11 is a graph of airflow rate through the air-turbine versus time for the exemplary shuttering scenario of FIG. 10.
Figure 12:
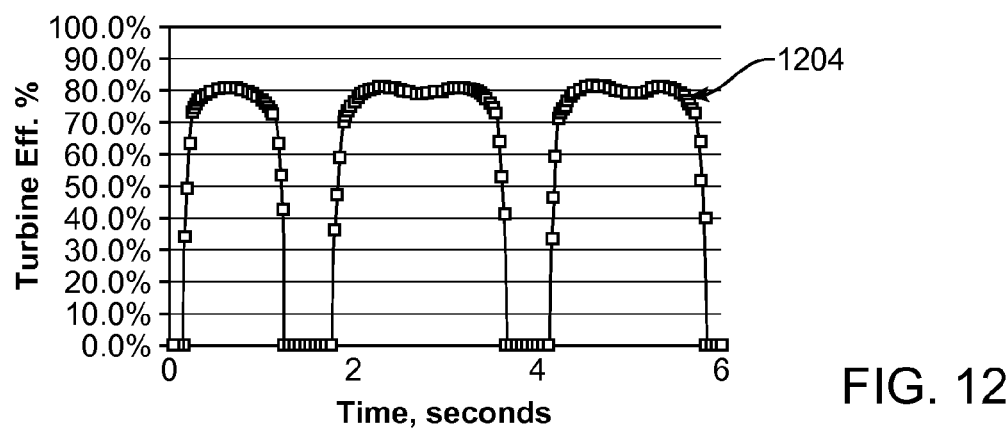
FIG. 12 is a graph of turbine efficiency versus time for the exemplary shuttering scenario of FIG. 10.

With the shuttering scheme and parameter of FIG. 10, the airflow shown in graph 1100 of FIG. 11 is achieved. As seen in graph 1100, the airflow rate, as depicted by plot 1104, changes suddenly when the shutter valve is closed (vertical lines 1108) and then again when the shutter valve is again opened (vertical lines 1112). This results in relatively high and relatively constant airflow rates when the shutter valve is open and air is passing through the air-turbine. Consequently, the air-turbine, when flow is present, can be operating at relatively high efficiencies. This is illustrated in graph 1200 of FIG. 12, which is a plot 1204 of air-turbine efficiency versus time. As seen from plot 1204, for the majority of time that the shutter valve is open the air-turbine is operating between about 70% to about 80% efficiency, which is high compared to efficiencies achieved in conventional OWC designs having no shuttering. Initial analyses and experimentation indicates that, relatively speaking, the improvement in efficiency appears to be in a range of about 15% to about 25%. Those skilled in the art will readily appreciate that this example is provided merely as an illustration of the unique shuttering techniques disclosed herein. However, with the knowledge gained by reading this disclosure, those skilled in the art will surely be able to implement other similar shuttering schemes using these basic teachings.

Partial-Admission Shuttering and Nozzling

Several ways of controlling the pressure within an OWC air-water chamber and, correspondingly, the flow of air through the one or more air-turbines communicating with the air-water chamber, are described in the foregoing sections. Those ways include taking advantage of the delayed pivoting (opening) of self-articulating turbine blades, providing self-articulating blade assemblies with a trip mechanism that holds the turbine blade(s) shut until a certain pressure is reached, and providing a shutter valve to each air-turbine. This section provides yet other ways of controlling the flow of a working fluid through a turbine in a manner that increases the performance of the turbine by better matching the working fluid flow rates to the performance range of the turbine at issue. These additional ways involve providing movable blades, for example, movable shutter blade and/or movable nozzle blades, that are configured and/or controlled to selectively occlude one or more portions of the flow area through the turbine to the flow of the working fluid. In this manner, the size of the flow area can be set and/or adjusted as desired to optimize the flow through the turbine, including maintaining a relative constant velocity through the turbine to improve turbine efficiency. When nozzle blades are used, the angles of the nozzle blades can be optimized for the particular flow rate at issue.

Figure 14A:
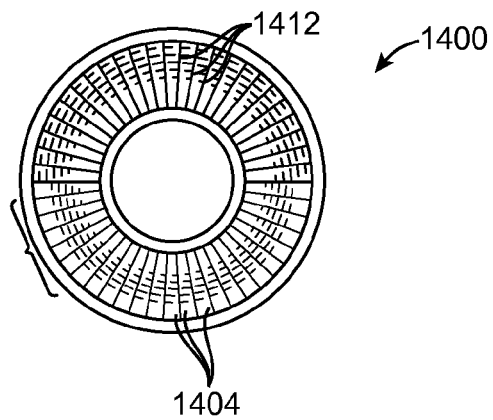
FIG. 14A is an end view of an alternative exemplary shutter and nozzle assembly made in accordance with the present invention, wherein the nozzle blades are arranged into individually controllable sectors and the assembly is shown having one 9-bladed sector in an open state.
Figure 14B:
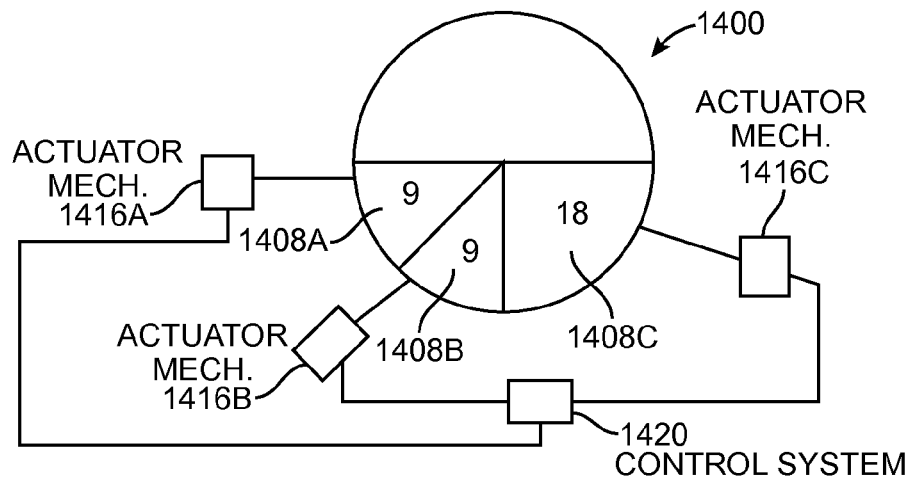
FIG. 14B is a diagram of the sectors of nozzle blades of the shutter and nozzle assembly of FIG. 14A.
Figure 14C:
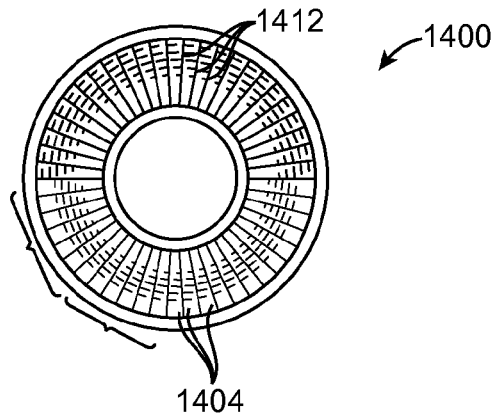
FIG. 14C is an end view of the shutter and nozzle assembly of FIG. 14A, showing two 9-bladed sectors in open states.

Conventionally for OWC systems, the airflow rate is varying from zero to a maximum and thus the air-turbine never sees the optimum air flow velocity that matches the speed of the turbine rotor. By modulating nozzle blades in accordance with the present invention, the admission area into the turbine rotor can be varied so as to enable the air velocity to be kept at an optimum level for which the turbine blades have been originally designed. It is noted that the control scheme can be as fine as controlling blades individually. However, more practical applications will typically allow for more coarse control, with blades being controlled as groups within sectors around the circumference of the machine. A variable control-sector control scheme is illustrated in FIGS. 14A to 14C and is unique in the field where typically if air is shuttered from the turbine, it is done for all or none of the nozzle or guide vanes. However, before proceeding to FIGS. 14A to 14C, a less complex example is first described to introduce variable nozzle blades and self-actuated shutter blades.

Figure 13A:
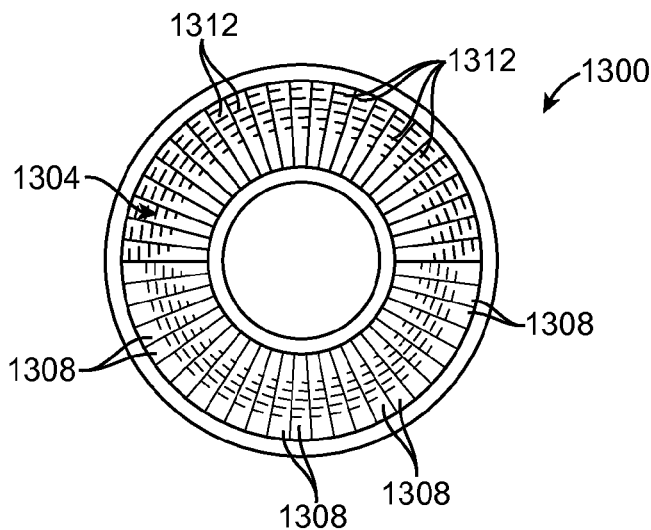
FIG. 13A is an end view of an exemplary shutter and nozzle assembly made in accordance with the present invention, wherein the shutter blades are spring loaded and the nozzle blades are pivotable.

FIG. 13A illustrates an exemplary shutter and nozzle assembly 1300 wherein half of the airflow area, i.e., the area of the annular region 1304, is occupied by variable-pitch nozzle blades 1308 (only a few labeled to avoid clutter) and the other half is occupied by self-articulating shutter blades 1312 (only a few labeled to avoid clutter). For context, shutter and nozzle assembly 1300 could be used in OCW electrical power generating system 200 of FIG. 2. In that case, one instantiation 1300A (FIG. 13B) of assembly 1300 (FIG. 13A) could be located immediately above (relative to FIG. 2) turbine rotor 208, and a second instantiation 1300B (FIG. 13C) of assembly could be located immediately below turbine rotor 208 (FIG. 2), with the two instantiations rotationally offset by 180° relative to one another, i.e., so that shutter blades 1312 (FIG. 13A) of the upper assembly are positioned over nozzle blades 1308 of the lower assembly and vice versa. This is seen by viewing FIGS. 13B and 13C in combination with one another. As will be understood after reviewing FIGS. 13B and 13C, the two instantiations 1300A and 1300B of nozzle and shutter assembly 1300 should be oriented so that when nozzle blades 1308 are directing airflow toward the blades of the turbine rotor (i.e., blades 212 of rotor 208 in the context of FIG. 2), shutter blades on the downstream side of the turbine rotor open.

Figure 13B:
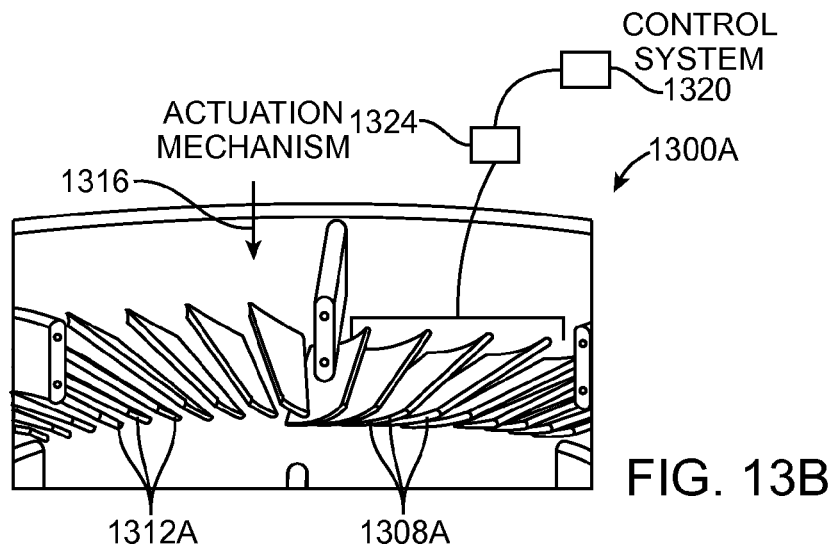
FIG. 13B is an enlarged perspective cutaway view of the shutter and nozzle assembly of FIG. 13A showing the shutter blades in an open position and the nozzle blades in a closed position.
Figure 13C:
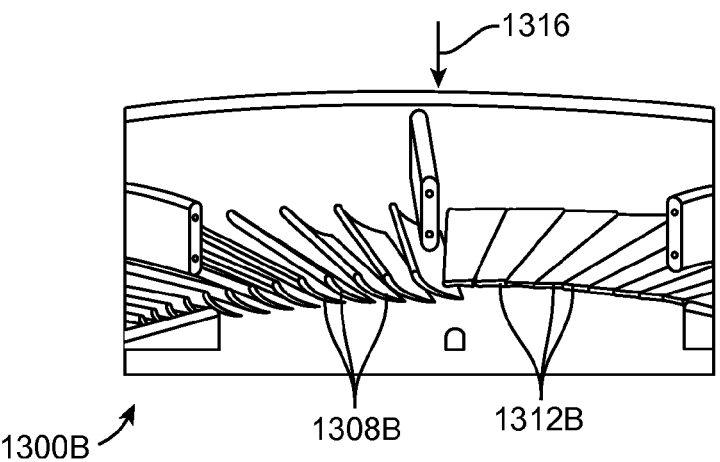
FIG. 13C is an enlarged perspective cutaway view of the shutter and nozzle assembly of FIG. 13A showing the shutter blades in a closed position and the nozzle blades in an open position.

FIG. 13B illustrates the positions of nozzle blades 1308A and shutter blades 1312A in instantiation 1300A when the airflow is in the direction indicated by arrow 1316. In this example, shutter blades 1312A are passive, i.e., they open and shut by action of the air flowing through instantiation 1300A and any biaser, for example, spring, torsion bar, etc., that may be present, if any. Nozzle blades 1308A, however, are actively actuated by a suitable control system 1320, for example, a control system that monitors one or more pressures and/or one or more airflows and/or turbine-rotor speed to determine the amount of pitch to impart into the nozzle blades. Actuation of nozzle blades 1308A can be achieved using any suitable actuation mechanism 1324, as will be understood by those skilled in the art. As seen in FIG. 3B, the airflow is in direction 1316, which causes shutter blades 1312A to open as shown.

In the scenario described above in which second instantiation 1300B (FIG. 13C) of nozzle and shutter assembly 1300 (FIG. 13A) is on the opposite side of the turbine rotor (208 of FIG. 2), when shutter blades 1312A are open as shown in FIG. 13B, nozzle blades 1308B (FIG. 13C) on second instantiation 1300B are open and pitched to the desired pitch. At the same time, nozzle blades 1308A of FIG. 13B, which would be opposite closed shutter blades 1312B (FIG. 13C) of second instantiation 1300B, can be substantially closed as shown in FIG. 13B, if desired. In alternative embodiments two instantiations 1300A and 1300B (FIGS. 13B and 13C, respectively) in the manner noted above, nozzle blades 1308A of FIG. 13B could remain open, since the shutter blades on the second instantiation would be closed. Nozzle blades 1308B can be actuated and controlled by an actuation mechanism (not shown, but can be similar to mechanism 1324 of FIG. 13B) and control system 1320 described above.

As mentioned above, FIGS. 14A to 14C are directed to a nozzle and shutter assembly 1400 (FIG. 14A) having nozzle blades 1404 (only a few labeled to avoid crowding) that are controlled in groups arranged into multiple sectors, here three sectors 1408A to 1408C as seen in FIG. 14B. Nozzle blades 1404 in each of sectors 1408A to 1408C are independently controllable relative to the nozzle blades in the other two sectors. In this example, half of nozzle and shutter assembly 1400 (FIG. 14A) contains nozzle blades 1404 and the other half contains shutter blades 1412 (only a few labeled to avoid crowding), in a manner similar to nozzle and shutter assembly 1300 of FIGS. 13A to 13C, and there are 36 nozzle blades and 36 shutter blades. As illustrated in FIG. 14B, sector 1408A contains a group of 9 nozzle blades 1404, sector 1408B contains a group of 9 nozzle blades, and sector 1408C contains a group of 18 nozzle blades.

As illustrated in FIG. 14B, each sector 1408A to 1408C has a corresponding actuator mechanism 1416A to 1416C for actuating nozzle blades 1408 in that segment. In this example, actuator mechanisms 1416A to 1416C are under the control of a control system 1420 that is operatively configured to control the actuator mechanisms in concert with one another to achieve the desired flow, for example, relatively constant velocity through the turbine (not shown), based on suitable input information, such as one or more air pressure measurements and/or one or more air velocity measurement and/or turbine-rotor-speed measurement. Those skilled in the art will understand how to configure and program control system 1420 to achieve the desired results for a particular application.

With the nozzle-blade sectorization illustrated in FIG. 14B, any of a number of nozzle-blade-state combinations can be achieved. For example, FIG. 14A illustrates nozzle blades 1404 in sector 1408A in an open state in which those 9 nozzle blades have a desired operating pitch, whereas the nozzle blades in sectors 1408B and 1408C are closed. As another example, FIG. 14C illustrates nozzle blades 1404 in both sectors 1408A and 1408B in an open state in which those 18 total nozzle blades have a desired operating pitch (the pitches can be different as between the two sectors), whereas the nozzle blades in sector 1408C are closed. In other examples, all of nozzle blades 1404 can be in open positions at the same time, either with the same pitch or with the pitches differing among differing sectors 1408A to 1408C, or all of the nozzle blades can be in their closed positions simultaneously. Of course, the number of nozzle blades 1404 and shutter blades 1412 provided for a particular design can be different from the number shown in this example in order to suit particular conditions. In addition, the blades of each type need not occupy half of the airflow region, but rather can be different, depending on design conditions.

Figure 15:
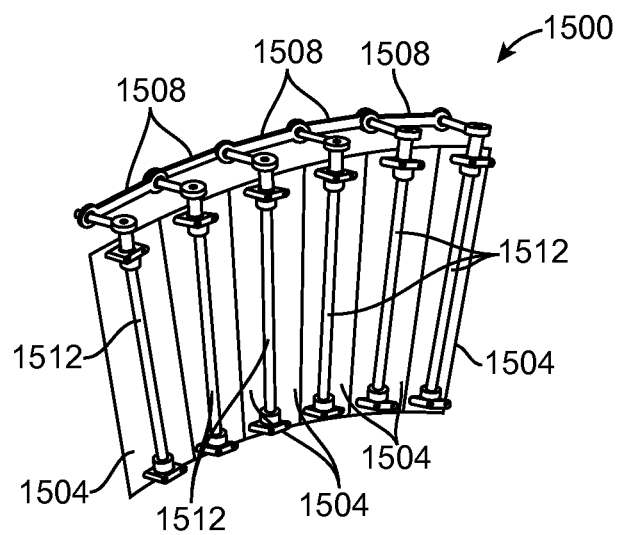
FIG. 15 is a perspective partial view of an exemplary blade-actuation mechanism that can be used to actuate nozzle blades and/or shutter blades in accordance with the present invention.

FIG. 15 illustrates a portion of a blade-actuation mechanism 1500 that can be used to actuate nozzle blades 1504, which could be, for example, nozzle blades 1308, 1404 of FIGS. 13A and 14A, respectively. As seen in FIG. 15, in this example actuation mechanism 1500 actuates a group of 6 nozzle blades 1504, but this mechanism could be used to actuate more or fewer blades, as the particular design at issue dictates. Actuation mechanism 1500 includes a series of linked linkages 1508 connected to axles 1512 that are rotationally fixed to corresponding respective ones of blades 1504. As the linkages 1508 are moved essentially linearly along their longitudinal axes, for example, by a motor, pneumatic actuator, hydraulic actuator, etc., axles 1512 and blades 1504 pivot in unison accordingly. It is noted that if the shutter blades of a particular design, such as shutter blades 1312, 1412 of FIGS. 13A and 14A, respectively, are active shutter blades, actuation mechanism 1500 could likewise be used to actuate the shutter blades. It is noted that blade supports are not shown in FIG. 15; however, those skilled in the art will readily be able to implement actuation mechanism 1500 in conjunction with such supports.

Figure 16:
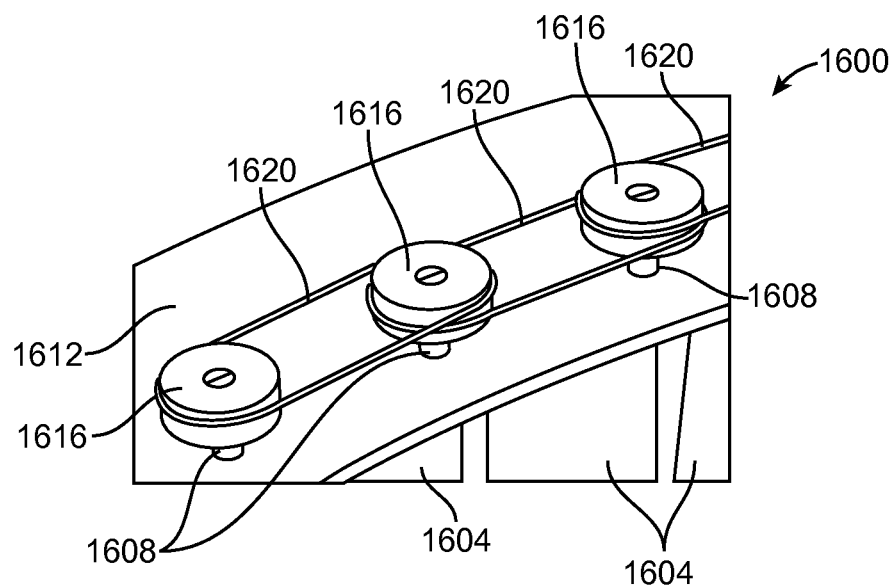
FIG. 16 is a perspective partial view of another exemplary blade-actuation mechanism that can be used to actuate nozzle blades and/or shutter blades in accordance with the present invention.

FIG. 16 illustrates a portion of another exemplary blade-actuation mechanism 1600 that can be used to actuate blades 1604, which can be either nozzle blades, such as nozzle blades 1308 or 1404 of FIGS. 13A and 14A, respectively, or shutter blades, such as shutter blades 1312 or 1412 of FIGS. 13A and 14A, respectively. In this embodiment, each blade 1604 is fixedly attached to an axle 1608 that is rotationally engaged with a support member 1612 (e.g., a support ring, like above) and is rotatable via a corresponding pulley 1616. Each pulley 1616 can be rotated by a corresponding flexible member 1620, for example, band, belt, chain, cord, rope, etc. As those skilled in the art will readily appreciate, each pulley 1616, and blade 1604, can be driven independently or driven in groups, such as shown in FIG. 16, wherein the pulleys are linked in series by the three flexible members 1620 shown. Those skilled in the art will understand that many other blade-actuation mechanisms can be utilized, many of which can be adapted from like conventional mechanism.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A turbomachine, comprising:
   a turbine comprising a rotor having a rotational axis and designed and configured to be driven by a working fluid, said rotor including:
   a blade support designed and configured to rotate about said rotational axis; and
   a plurality of self-articulating-blade assemblies engaged with said blade support and each including:
   a spindle having a first end and a second end, said first end being secured to said blade support and said spindle extending radially outward therefrom;
   a blade having a leading edge and a pivot axis extending substantially parallel to said leading edge, wherein said blade is pivotably engaged with said spindle so as to allow said blade to pivot about said pivot axis;
   a rotation biaser extending through said spindle and engaged with said blade in a manner that controls pivoting of said blade about said pivot axis in response to changes in pressure of the working fluid; and
   an extension tube extending radially inward from said first end of said spindle, said rotation biaser extending through said extension tube.

2. A turbomachine according to claim 1, wherein said rotation biaser is designed and configured to directly respond to pressure of the working fluid on said blade.

3. A turbomachine according to claim 1, wherein said rotation biaser is designed and configured to:
   bias rotation of said blade about said pivot axis to a base position; and
   permit controlled pivoting of said blade about said pivot axis as a function of the pressure of the working fluid on said blade.

4. A turbomachine according to claim 3, wherein said base position is a neutral position between opposing directions and said rotation biaser is designed and configured to permit controlled pivoting of said blade about said pivot axis in both of said opposing directions as a function of the pressure of the working fluid on said blade.

5. A turbomachine according to claim 4, wherein said blade is a symmetrical air/hydrofoil.

6. A turbomachine according to claim 5, wherein said turbine is a Wells-type turbine.

7. A turbomachine according to claim 3, wherein said rotation biaser comprises a torsion member having a longitudinal axis extending along said pivot axis of said blade.

8. A turbomachine according to claim 7, wherein said blade has a radially outward edge, and wherein said torsion member has a first end and second end, said first end being fixedly coupled to said radially outward edge and said second end being fixedly coupled to said blade support.

9. A turbomachine according to claim 8, wherein said second end of said torsion member is fixedly coupled to said extension tube.

10. A turbomachine according to claim 3, wherein said rotation biaser comprises a spring.

11. A turbomachine according to claim 2, wherein the pressure on said blade resolves to a center of pressure on said blade, said pivot axis being located between said leading edge of said blade and the center of pressure.

12. A turbomachine according to claim 1, wherein said blade has a trailing edge spaced from said leading edge, said blade designed and configured to have a higher mass density between said leading edge and said pivot axis than between said pivot axis and said trailing edge.

13. A turbomachine according to claim 12, wherein, between said pivot axis and said trailing edge, said blade comprises a skin.

14. A turbomachine according to claim 13, wherein said skin covers a rigid foam.

15. A turbomachine according to claim 12, wherein said blade is configured to have a center of gravity proximate to said pivot axis.

16. A turbomachine according to claim 12, wherein said blade has a chord line extending between said leading and trailing edges, and wherein said blade comprises a high density material positioned along said chord line between said leading edge and said pivot axis.

17. A turbomachine according to claim 16, wherein said high density material comprises an elongate member.

18. A turbomachine according to claim 16, wherein said high density material is located in said leading edge.

19. A turbomachine according to claim 1, wherein said blade is slidably disposed over said spindle.

20. A turbomachine according to claim 19, wherein said blade has a radially outward edge, and wherein said second end of said spindle is spaced from said radially outward edge.

21. A turbomachine according to claim 20, wherein said rotation biaser extends through said spindle substantially to said radially outward edge.

22. A turbomachine according to claim 1, wherein said blade further comprises a pivot tube and said spindle includes an outer surface, said pivot tube slidably disposed over said spindle, and wherein each of said self-articulating blade assemblies further comprises a lubrication system comprising a seal and a lubricant containment jacket, said seal located in a radially outward end of said pivot tube, and said lubricant containment jacket positioned around said outer surface of said spindle.

23. An oscillating water column (OWC) system, comprising:
a structure containing a wave-air chamber designed and configured to provide an air-filled region of variable volume as one or more water-waves pass through said wave-air chamber, said structure including an opening to air outside said structure when the OWC system is deployed;
a turbine-generator unit that includes:
an electrical generator; and
an air turbine that includes a rotor mechanically coupled to said electrical generator in a manner that said rotor drives said electrical generator during operation of the OWC system, said rotor operatively positioned so that it is driven by air passing through said opening during operation of the OWC system, said rotor including:
a spindle secured to said rotor and extending radially outward therefrom, said spindle having an outer surface and a shoulder formed in said outer surface;
an airfoil having a leading edge and a pivot axis extending substantially parallel to said leading edge, wherein said airfoil is slidably disposed over and pivotably engaged with said spindle so as to allow said airfoil to pivot about said pivot axis, said airfoil being supported by said shoulder; and
a rotation biaser engaged with said airfoil in a manner that controls pivoting of said airfoil about said pivot axis in direct response to changes in pressure of the air on a part of said rotor.

24. An OWC system according to claim 23, wherein said rotation biaser is designed and configured to directly respond to pressure of the air on said airfoil.

25. An OWC system according to claim 24, wherein said rotation biaser is designed and configured to:
bias rotation of said airfoil about said pivot axis to a base position; and
permit controlled pivoting of said airfoil about said pivot axis as a function of the pressure of the air on said airfoil.

26. An OWC system according to claim 25, wherein said base position is a neutral position between opposing directions and said rotation biaser is designed and configured to permit controlled pivoting of said airfoil about said pivot axis in both of said opposing directions as a function of the pressure of the air on said airfoil.

27. An OWC system according to claim 26, wherein said airfoil is a symmetrical airfoil.

28. An OWC system according to claim 27, wherein said turbine is a Wells turbine.

29. An OWC system according to claim 25, wherein said rotation biaser comprises a torsion member having a longitudinal axis extending along said pivot axis of said airfoil.

30. An OWC system according to claim 25, wherein said rotation biaser comprises a spring.

31. An OWC system according to claim 24, wherein the pressure on said airfoil resolves to a center of pressure on said airfoil, said pivot axis being located between said leading edge of said airfoil and the center of pressure.

32. An OWC system according to claim 23, wherein said airfoil has a trailing edge spaced from said leading edge, said airfoil designed and configured to have a higher mass density between said leading edge and said pivot axis than between said pivot axis and said trailing edge.

33. An OWC system according to claim 32, wherein, between said pivot axis and said trailing edge, said airfoil comprises a skin.

34. An OWC system according to claim 33, wherein said airfoil comprises a rigid foam and said skin covers said rigid foam.

35. A turbomachine according to claim 23, wherein said spindle has an inner lumen, and wherein said rotation biaser extends through said inner lumen.

36. A turbomachine according to claim 23, wherein said airfoil has a radially outward edge and said spindle has a first end secured to said rotor and a second end extending radially outward therefrom, wherein said second end of spindle is spaced from said radially outward edge of said airfoil.

37. A turbomachine according to claim 36, wherein said rotation biaser extends through said spindle substantially to said radially outward edge.

38. A turbomachine according to claim 23, wherein said rotation biaser is a tensile member configured to hold said airfoil in engagement with said shoulder.

39. A turbomachine, comprising:
a turbine comprising a rotor having a rotational axis and designed and configured to be driven by a working fluid, said rotor including:
a blade support designed and configured to rotate about said rotational axis; and
a plurality of self-articulating-blade assemblies engaged with said blade support and each including:
a spindle having a first end and a second end, said first end being secured to said blade support and said spindle extending radially outward therefrom;
a blade having a radially-outward edge, a leading edge, and a pivot axis extending substantially parallel to said leading edge, wherein said blade is pivotably engaged with said spindle so as to allow said blade to pivot about said pivot axis;
a rotation biaser extending through said spindle and engaged with said blade in a manner that controls pivoting of said blade about said pivot axis in response to changes in pressure of the working fluid; and
a lubrication system comprising a seal located proximate said radially-outward edge of said blade and spaced radially outward from said second end of said spindle.

40. A turbomachine according to claim 39, wherein said seal is located radially inward of a radially outward end of said rotation biaser.

41. A turbomachine according to claim 39, wherein said blade is slidably disposed over said spindle.

42. A turbomachine according to claim 39, wherein said rotation biaser extends through said spindle substantially to said radially outward edge.

43. A turbomachine according to claim 39, wherein said spindle has an outer surface and a shoulder formed in said outer surface, said blade being slidably disposed over said spindle and configured to come into contact with said shoulder.

44. A turbomachine according to claim 43, wherein said rotation biaser is a tensile member configured to hold said airfoil proximate said shoulder.

45. A turbomachine according to claim 43, wherein said lubrication system further comprises a lubricant containment jacket positioned around said outer surface of said spindle.

* * * * *

UNITED STATES PATENT AND TRADEMARK OFFICE
CERTIFICATE OF CORRECTION

| | |
|---|---|
| PATENT NO. | : 8,974,184 B2 |
| APPLICATION NO. | : 13/399604 |
| DATED | : March 10, 2015 |
| INVENTOR(S) | : Frederick E. Becker et al. |

It is certified that error appears in the above-identified patent and that said Letters Patent is hereby corrected as shown below:

Specification

Please insert the following paragraph immediately after the title in column 1:

--This invention was made with Government support under Grant No. DE-SC0003571 awarded by the Department of Energy Small Business Innovation Research. The Government may have certain rights in this invention.--

Signed and Sealed this
Eighth Day of December, 2015

Michelle K. Lee
*Director of the United States Patent and Trademark Office*